United States Patent [19]
Mashimo et al.

[11] Patent Number: 5,126,853
[45] Date of Patent: Jun. 30, 1992

[54] DROPOUT DETECTING APPARATUS

[75] Inventors: Akira Mashimo, Tokorozawa; Masahiko Fukushima, Fussa, both of Japan

[73] Assignee: TEAC Corporation, Japan

[21] Appl. No.: 425,794

[22] Filed: Oct. 23, 1989

[30] Foreign Application Priority Data

Oct. 26, 1988 [JP] Japan ................... 63-270295

[51] Int. Cl.$^5$ ............................ H04N 5/94
[52] U.S. Cl. ................... 358/336; 358/342; 360/38.1
[58] Field of Search ........... 358/336, 314, 340, 342, 358/160, 167, 177; 369/107, 124, 59, 60; 360/38.1

[56] References Cited

U.S. PATENT DOCUMENTS

| | | | |
|---|---|---|---|
| 3,912,858 | 10/1975 | Kenney | 358/314 |
| 4,158,855 | 6/1979 | Thomas et al. | 358/336 |
| 4,376,289 | 3/1983 | Reitmeier et al. | 358/314 |
| 4,737,723 | 4/1988 | Mita | 358/336 |
| 4,803,677 | 3/1989 | Yamaguchi et al. | |
| 4,805,040 | 2/1989 | Oku et al. | 358/336 |
| 4,835,758 | 5/1989 | Fujushima | 358/336 |
| 4,847,709 | 7/1989 | Uehara et al. | 358/336 |
| 4,893,129 | 1/1990 | Takemura | 358/336 |
| 4,951,154 | 8/1990 | Sekiguchi et al. | 358/336 |

FOREIGN PATENT DOCUMENTS

| | | | |
|---|---|---|---|
| 56-74805 | 6/1981 | Japan | 360/38.1 |
| 57-198511 | 12/1982 | Japan | 360/38.1 |
| 57-203382 | 12/1982 | Japan | 358/314 |

Primary Examiner—Roy N. Envall, Jr.
Assistant Examiner—Thai Tran
Attorney, Agent, or Firm—Andrus, Sceales, Starke & Sawall

[57] ABSTRACT

A dropout detecting apparatus includes a high-frequency-range compensation circuit for emphasizing a signal component in a high-frequency-range of a reproduced high-frequency signal, a reference signal generating circuit for deriving a reference signal from the reproduced high-frequency signal. The reference signal has an inverse relationship to the reproduced high-frequency having the emphasized signal component supplied from the high-frequency-range compensation circuit. The apparatus further includes a pulse signal generating circuit for converting the reproduced high-frequency signal supplied from the high-frequency-range compensation circuit into a pulse signal on the basis of the reference signal supplied from the reference signal generating circuit, and a circuit for determining whether the reproduced high-frequency signal includes a dropout on the basis of a change in period of the pulse signal supplied from the pulse signal generating circuit and for outputting a dropout detection signal.

6 Claims, 7 Drawing Sheets

DROPOUT DETECTING APPARATUS

BACKGROUND OF THE INVENTION

The present invention relates to an apparatus to detect dropout (loss of information) in reproduced signals when information stored in a predetermined format is reproduced from an information storage disk such as an optical disk or magnetic disk or the like.

A recording and reproducing apparatus for an information storage disk is disclosed in U.S. Pat. No. 4,803,677. The disclosed recording and reproducing apparatus for use in an information storage disk records information by using a light beam to form pits on the surface of the disk, and reproduces the information by using a light beam to read the pits on the surface of the disk. Information is recorded on the disk in the form of a high-frequency signal produced by frequency-modulating a video signal. The reproduction of video signals is done by demodulating the high-frequency signal reproduced from the disk. In such a reproduction procedure, dropouts may occur in the reproduced high-frequency signals due to unevenness or moisture on the disk, the attachment of dust or other foreign matter to the disk, or due to pinholes in the disk itself etc. Because of this, the reproduction device performs dropout detect processing for the reproduced high-frequency signal and performs compensation processing or the like if dropout is detected. This compensation processing, for instance, involves replacing the video signal of the detected dropout portion with a partial video signal of the corresponding portion of the previous line.

Figure 1A:
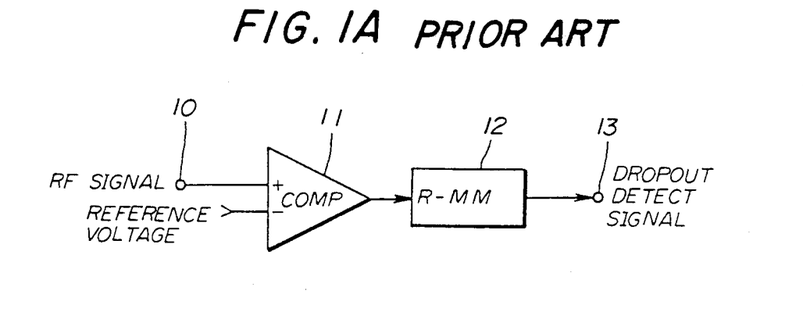
FIG. 1A is a block diagram of a conventional dropout detection apparatus.
Figure 1B:
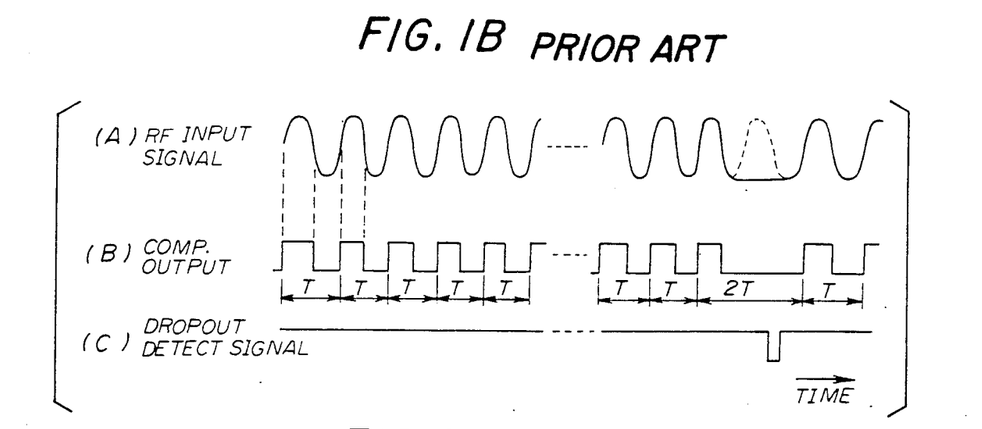
FIG. 1B and FIG. 1C are signal waveform diagrams of signals observed at parts of the conventional dropout detection apparatus shown in FIG. 1.

FIG. 1A is a block diagram indicating one example of a conventional dropout detector apparatus. The high-frequency signal (RF signals) reproduced from the disk is input to terminal 10. The high-frequency signal has the waveform indicated in FIG. 1B(A). A comparator 11 compares the high-frequency signal with a predetermined reference voltage and outputs a high-level voltage (hereinafter simply referred to as H-level) when the level of the high-frequency signal exceeds the reference voltage level. Accordingly, the signal output from the comparator 11 is therefore a rectangular-waveform pulse as indicated in FIG. 1B(B). The rectangular-waveform pulse is inputted to a re-triggerable mono-stable multivibrator 12. The re-triggerable mono-stable multivibrator 12 is set equal to time 1.5 T as 1.5 times the cycle T of the rectangular-waveform pulse signals from the comparator 11 on the basis of the status of the RF signal. When the re-triggerable mono-stable multivibrator 12 is triggered by said rectangular-waveform pulse signal within the time 1.5 T, it maintains an unstable status at the output H-level, and when the cycle of the rectangular-waveform pulse signal exceeds the time 1.5 T because of dropout of the RF signals (Refer to FIG. 1B(A),) it outputs a dropout detect signal of a low-level voltage (hereinafter simply referred to as L-level) as indicated in FIG. 1B(C). This dropout detect signal is outputted through terminal 13.

It is noted that the level of the high-frequency component of the RF signal is lowed if the spot diameter of the light beam is not sufficiently small when the information stored on the disk is reproduced as RF signals. When this occurs, the peaks A, B (absolute values) of the waveform of the RF signal do not exceed the reference voltage, as for example, is indicated in FIG. 1C(A), and the dropout in the RF signal is therefore detected for these portions.

Figure 2A:
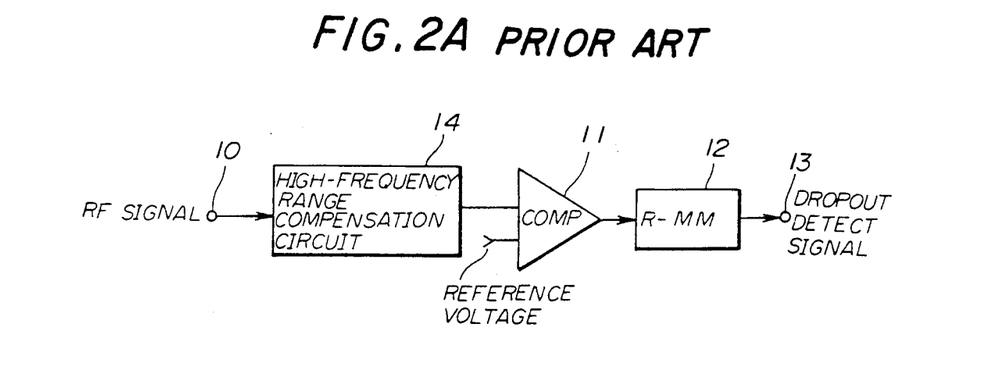
FIG. 2A is a block diagram of another conventional dropout detection apparatus.

The dropout detection apparatus indicated in FIG. 2(A) is proposed in order to prevent erroneous dropout detection such as the above mentioned.

This apparatus comprises a high-frequency-range compensation circuit 14 and is configured so that the RF signal is inputted to the comparator 11 after it has been processed by this high-frequency-range compensation circuit 14. Moreover, the terminals 10, 13 and the re-triggerable mono-stable multivibrator 12 have the same configuration as shown in FIG. 1A.

Figure 1C:
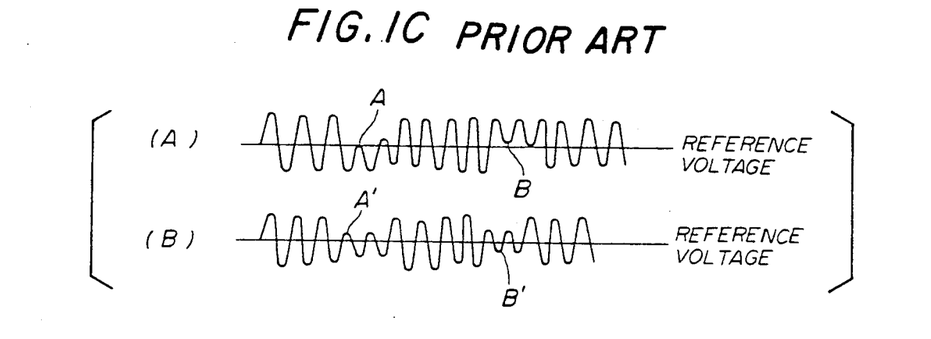

The high-frequency-range compensation circuit 14 amplifies high-frequency components of the RF signal so that RF signal with the waveform indicated in FIG. 1C(A) is rectified to have the waveform indicated in FIG. 1C(B). Accordingly, the new peaks A', B' corresponding to the previously mentioned peaks A, B exceed the reference voltage and erroneous dropout detection is prevented.

When the disk stores information with high recording density, it is necessary that the amount of compensation (amount of amplification) performed by the said high-frequency-range compensation circuit 14 is proportionately large.

Figure 2B:
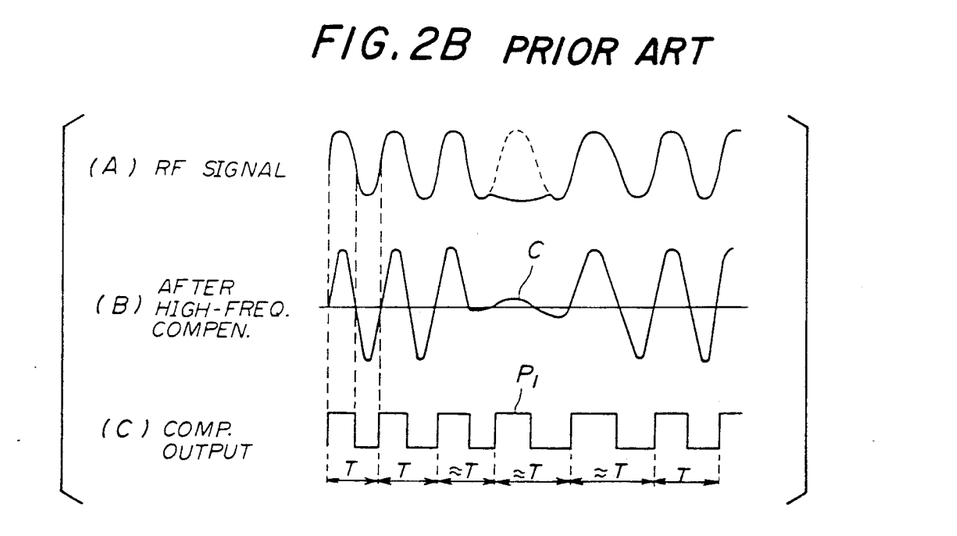
FIG. 2B is a signal waveform diagram of signals observed at parts of the conventional dropout detection apparatus shown in FIG. 2A.

When the amount of compensation performed by the said high-frequency-range compensation circuit 14 is large, the signal containing dropout as indicated by the dotted line in FIG. 2B(A), is compensated by the high-frequency-range compensation circuit 14 to have the waveform indicated in FIG. 2B(B). That is, the new peak C exceeding the reference voltage is formed for the dropout portion. Because of this, the output signal of the comparator 11 forms a pulse P1 corresponding to the previously mentioned peak C as indicated in FIG. 2B(C), and this creates the problem of dropout not being able to be detected even though it has occurred.

SUMMARY OF THE INVENTION

Accordingly, it is a general object of the present invention to provide a novel and useful dropout detector apparatus for reproduced signals from an information recording disk, in which the problems described heretofore are eliminated.

Another objective of the present invention is to provide a dropout detector apparatus for reproduced signals from an information recording disk, that enables correct dropout detection.

The above objectives can be achieved by a dropout detector apparatus, comprising information reproducing means for reproducing a high-frequency signal including information stored on information recording disk, high-frequency-range compensating means, coupled to the information reproducing means, for emphasizing a signal component in a high-frequency range of thereproduced high-frequency signal supplied from said information reproducing means, reference signal generating means, coupled to the information recording means, for deriving a reference signal from the reproduced high-frequency signal supplied from the information reproducing means, the reference signal having an inverse relationship to the reproduced high-frequency having the emphasized signal component supplied from the high-frequency-range compensating means, pulse signal generating means, coupled to the high-frequency-range compensating means and the reference signal generating means, for converting the reproduced high-frequency signal supplied from the high-frequencyrange compensating means into a pulse signal on the basis of the reference signal supplied from the reference signal generating means, and determining means, coupled to the pulse signal generating means, for determining whether the reproduced high-frequency signal includes a dropout on the basis of a change in period of the pulse signal supplied from the pulse signal generating means and for outputting a dropout detection signal based on the determination results.

Other objects and further features of the present invention will become apparent from the following detailed description when read in conjunction with attached drawings.

BRIEF DESCRIPTION OF THE DRAWINGS

FIGS 5(A)–(H) and 6(A)–(H) are signal waveform diagrams of signals at parts of the dropout detection apparatus shown in FIG. 4.

DESCRIPTION OF THE PREFERRED EMBODIMENTS

Figure 3A:
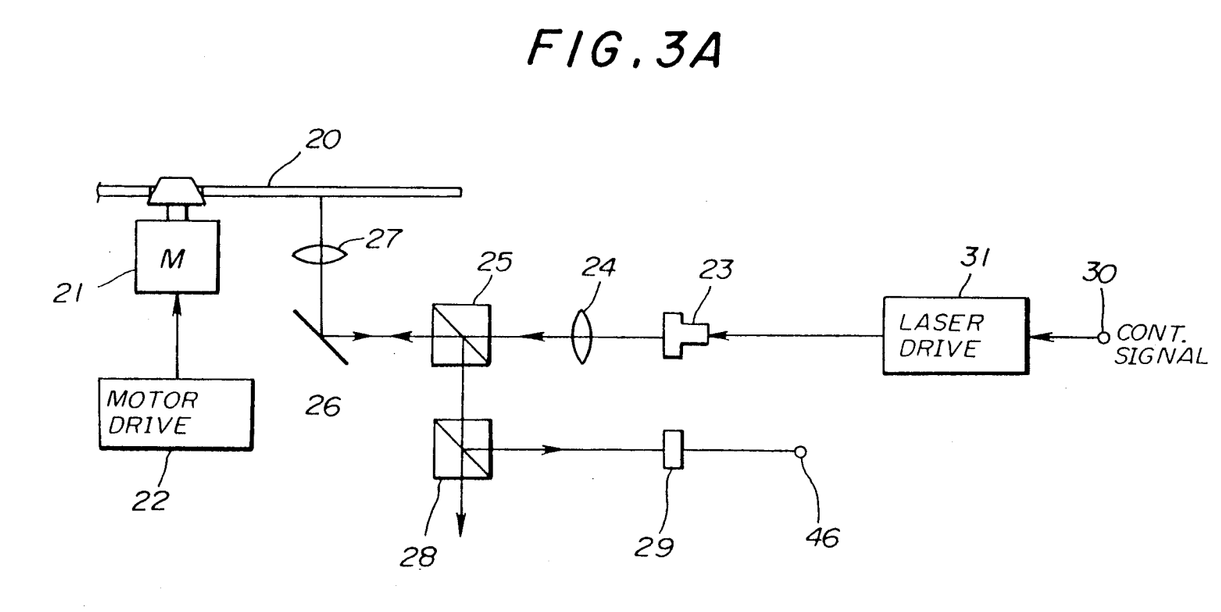
FIG. 3A is a diagram of a basic configuration of a reproduction signal system for an information recording disk.

FIG. 3A indicates a basic configuration of a reproduction system for an information recording disk. This apparatus is an optical disk apparatus using optical disks as the information recording disks. Information is written in a predetermined format on the disk 20 by using a laser beam to form pits thereon. The disk 20 is rotatably driven by a motor 21, which is controlled so as to rotate at a constant speed drive by a motor driver 22. A control signal input to a terminal 30 is used as the basis for the laser driver 31 to control the light emitted by the laser diode 23. The laser beam from the laser diode 23 passes through a collimation lens 24, a beam splitter 25, a tracking mirror 26 and an objective lens 27 and is focused upon the surface of the disk 20. In addition, a beam reflected from the disk 20 passes through the objective lens 27, the tracking mirror 26, the beam splitter 25 and another beam splitter 28 and is irradiated onto a photosensor 29. The laser beam irradiated onto the photosensor 28 has been modulated in accordance with the information stored on the disk 20 and a high-frequency signal corresponding to the stored information is outputted from the photosensor 29 and sent to a terminal 46.

Moreover, the beam progressing in a direction different to the optical sensor 29 because of the other beam splitter 28, is used for speed control of the motor 21 and tracking control.

Figure 3B:
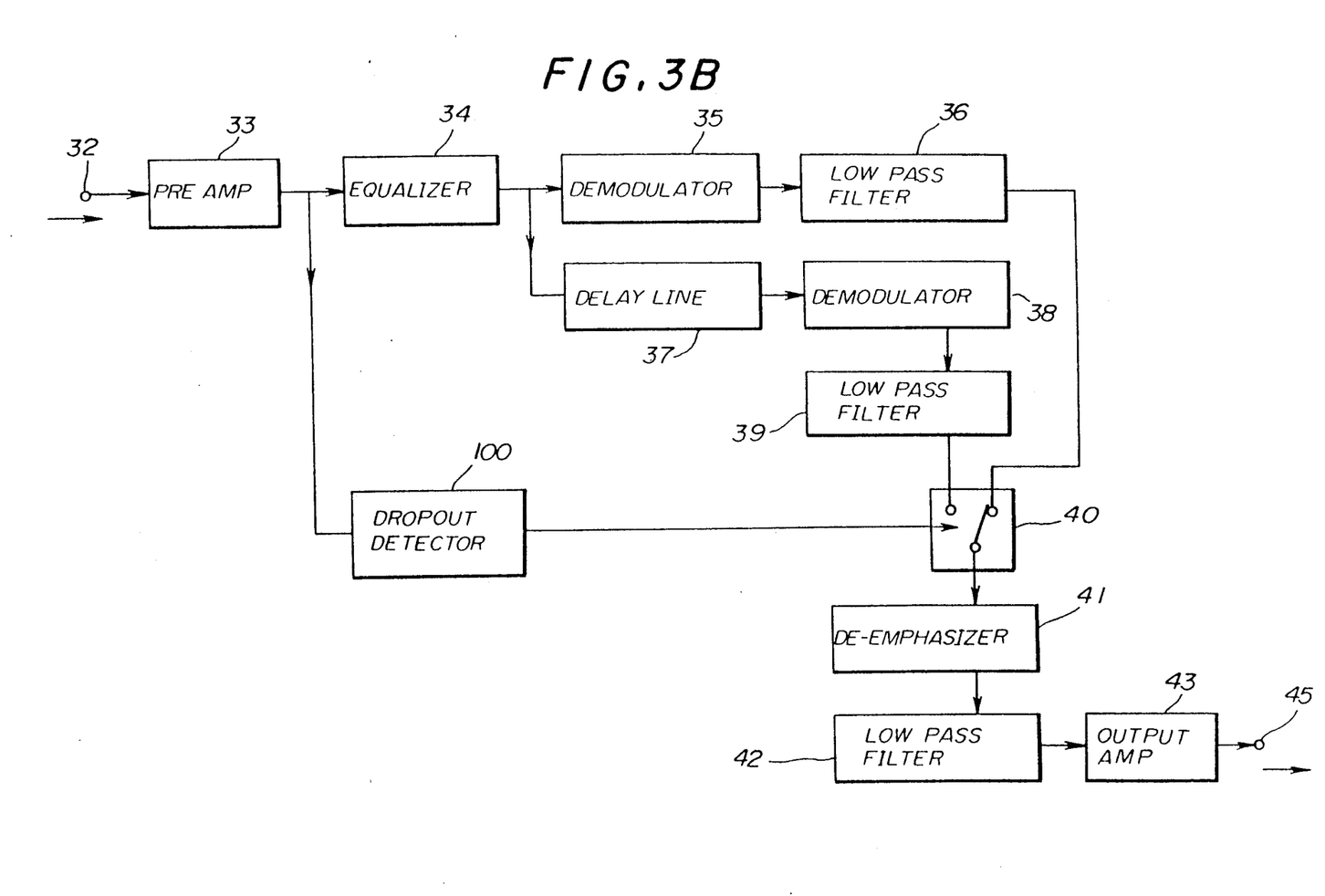
FIG. 3B is a block diagram of a basic configuration of a signal processing system provided in the reproduction signal system for an information recording disk, to which a dropout detection apparatus according to the present invention has been applied.

FIG. 3B is a block diagram of the basic configuration of a signal processing system.

The high-frequency signals supplied from the terminal 46 (FIG. 3A) pass through a terminal 32, a pre-amplifier 33 and an equalizer 34 and are then branched into two signal paths. The signal in one signal path is sent to a demodulator 35, which frequency-demodulates the input signal, and then to a low-pass filter 36 to remove the carrier signal and generate a video signal. The video signal is inputted to one of two terminals of a switching circuit 40. The signal of the other signal path is sent to a one-line delay line 37 and then to a demodulator 38 and a low-pass filter 39 to become a video signal, which is then inputted to another one of the terminals of the switching circuit 40. The switching circuit 40 selectively connects one of the two signal paths to a de-emphasizer 41. The selected video signal passing through the switching circuit 40 is sent to the de-emphasizer 41 and a low-pass filter 42, which function to reduce noises in a high-frequency-range. Then the video signal from the low-pass filter 42 passes through an output amplifier 43 to become a finalized video signal, which is then outputted to a terminal 45.

The switching circuit 40 is controlled according to a signal from a dropout detector 100. The dropout detector 100 detects dropout in the reproduction high-frequency signal (RF signals) outputted from the pre-amplifier 33. Normally (in the absence of dropout), the switching circuit 40 selects the signal path including the demodulator 35. When the dropout detector 100 detects a dropout, the switching circuit 40 is switched so as to connect the path related to the one-line delay line 37.

Figure 4:
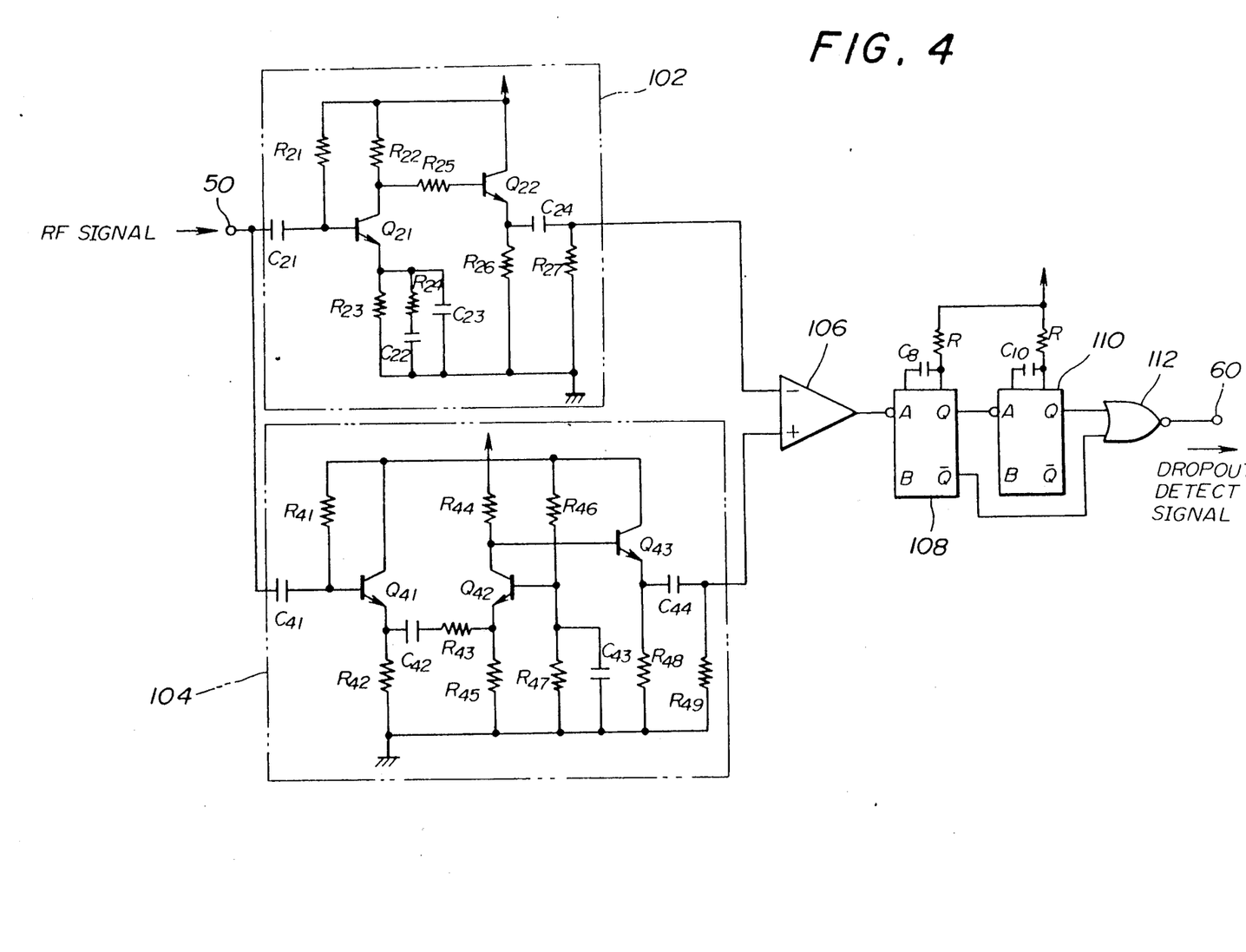
FIG. 4 is a circuit diagram of the dropout detection apparatus according to an embodiment of the present invention.

FIG. 4 is a circuit diagram of the configuration of the dropout detector 100.

The high-frequency signal (RF signals) from the pre-amplifier 33 is inputted to a terminal 50. The RF signal inputted to the terminal 50 is then supplied to a high-frequency-range compensation circuit 102 and a reference signal generation circuit 104. The high-frequency-range compensation circuit 102 comprises transistors Q21 and Q22, resistors R21 through R27, and capacitors C21 through C24. The high-frequency-range compensation circuit 102 inverts the input RF signal and amplifies (emphasizes) their high-frequency components (high-frequency-range compensation). The reference signal generation circuit 104 comprises transistors Q41 through Q43, resistors R41 through R49, and capacitors C41 through C44. The reference signal generation circuit 104 amplifies the inputted RF signal. The amplification characteristics of the high-frequency-range compensation circuit 102 and the reference signal generation circuit 104 are determined by the electrical characteristics of the respective transistors, resistors and capacitors. Because the high-frequency-range compensation circuit 102 inverts the RF signal, the high-frequency signal output from the high-frequency-range compensation circuit 102 and the signals outputted from the reference signal generation circuit 104 are a mutually inverse relationship. The high-frequency signal that has undergone high-frequency-range compensation and which has been outputted from the high-frequency-range compensation circuit 102 is inputted to an inverted input terminal (−) of a comparator 106, and the signal output from the reference signal generation circuit 104 is inputted to a non-inverted input terminal (+) of the comparator 106.

The comparator 106 outputs the H-level voltage when the signal level of the input to the non-inverted input terminal is higher than the signal level of the input to the inverted input terminal. In addition, the output of the comparator 106 becomes L-level voltage when there is the reverse relationship between the levels of the signals input to each input terminal (−), (+). Accordingly, the output of the comparator 106 becomes a rectangular pulse signal corresponding to the levels of the output signals from the reference signal generation circuit 104 and the high-frequency-range compensation circuit 102.

The cycle of the rectangular pulse signal is the same as the cycle of the RF signal (from the reference signal generation circuit 104 or high-frequency-range compensation circuit 102) input to the comparator 106. The rectangular pulse signal output from the comparator 106 is supplied as a trigger signal to a re-triggerable mono-stable multivibrator 108. The re-triggerable mono-stable multivibrator 108 has a set time less than twice the cycle T (for example 1.5 T) of the rectangular pulse signal normally outputted from the comparator 106, so that it is in the active status (where output Q=H-level, inverted output Q=L-level) for only the set time 1.5 T (in this case) from the fall of the input rectangular pulse signal. The set time 1.5 T is determined by the electrical characteristics of the external resistor R8 and capacitor C8. Also, when the trigger to the re-triggerable mono-stable multivibrator 108 continues for within the set time 1.5 T, the output Q is maintained at the H-level. The signal output from the output terminal Q of the re-triggerable mono-stable multivibrator 108 is supplied as a trigger signal to a second mono-stable multivibrator 110. This mono-stable multivibrator 110 has a predetermined set time τ and is in the active status (where output Q=H-level, inverted output Q=L-level) for only the set time τ from the fall of the signal from the first mono-stable multivibrator 108. The set time τ is based on by the electrical characteristics (time constant) of the external resistor R10 and capacitor C10, to about 1 to 5 μsec. The signal from the inverted output terminal Q of the first mono-stable multivibrator 108 and the signal from the output terminal Q of the second mono-stable multivibrator 110 are inputted to a NOR circuit 112.

The output of the NOR circuit 112 is supplied to a terminal 60. The output from the terminal 60 is externally outputted to the switching circuit 40 (FIG. 3B) 100 as a dropout detection signal.

Figure 5:
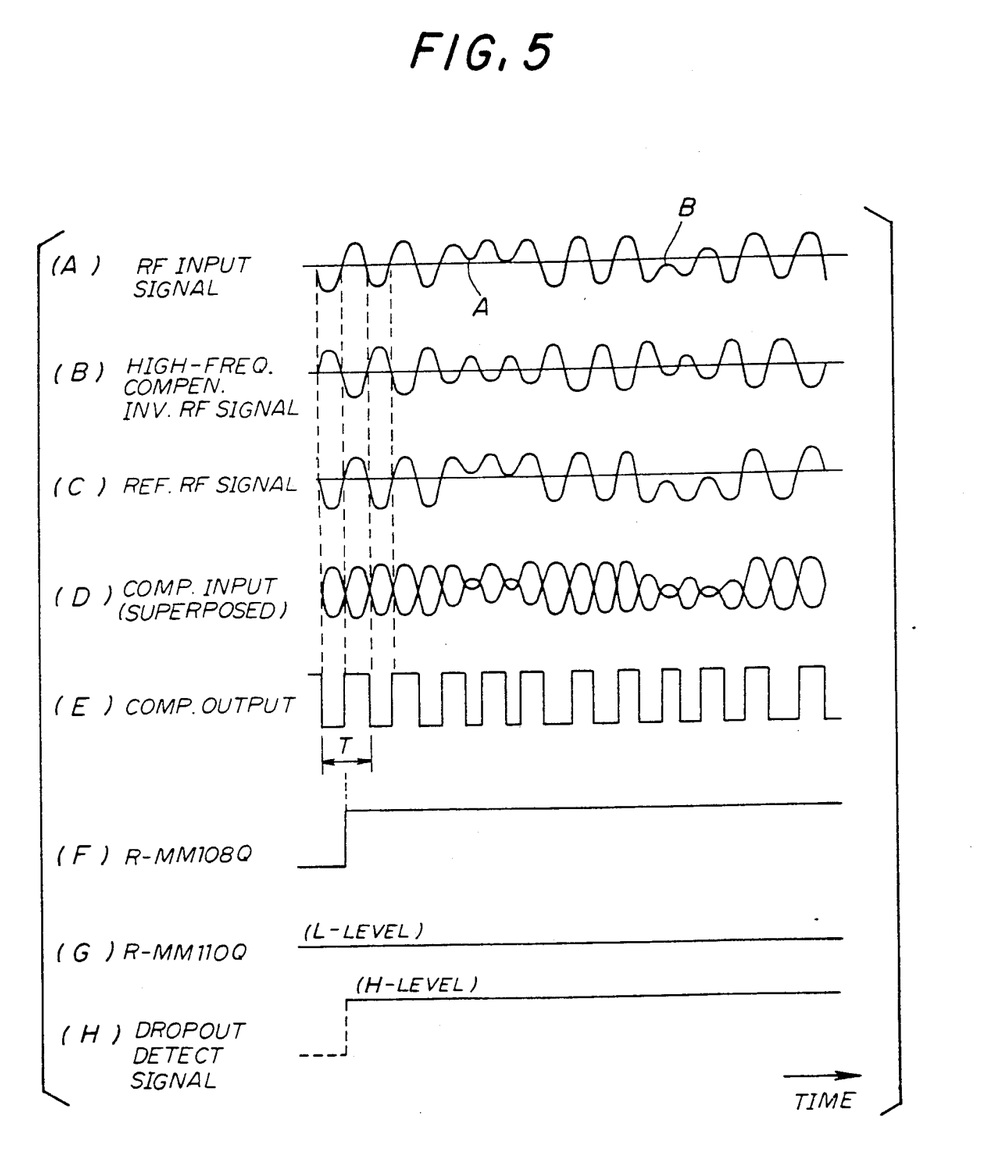

When the RF signal output from the pre-amplifier 33 has peaks A, B that do not reach the conventional reference voltage level indicated in FIG. 5(A), the signal from high-frequency-range compensation circuit 102 becomes as indicated in FIG. 5(B) and the signal from the reference signal generation circuit 104 becomes as indicated in FIG. 5(C). The signal indicated in FIG. 5(B) changes to the status where the RF signal is inverted and amplified, and the signal indicated in FIG. 5(C) changes to the status where RF signal is simply amplified, so that the two signals are inverted with respect to each other. When these signals are superposed, the status of the superposed signal is as indicated in FIG. 5(D). Because of this, the output of the comparator 106 becomes as indicated in FIG. 5(E) and is a rectangular pulse with a cycle T. Accordingly, the re-triggerable mono-stable multivibrator 108 is triggered for each time T inside the set time of 1.5 T and the output Q is maintained at the H-level. When this occurs, the second mono-stable multivibrator 110 is not triggered and its output Q is maintained at the L-level. This status for the signals indicates that there is no dropout.

Figure 6:
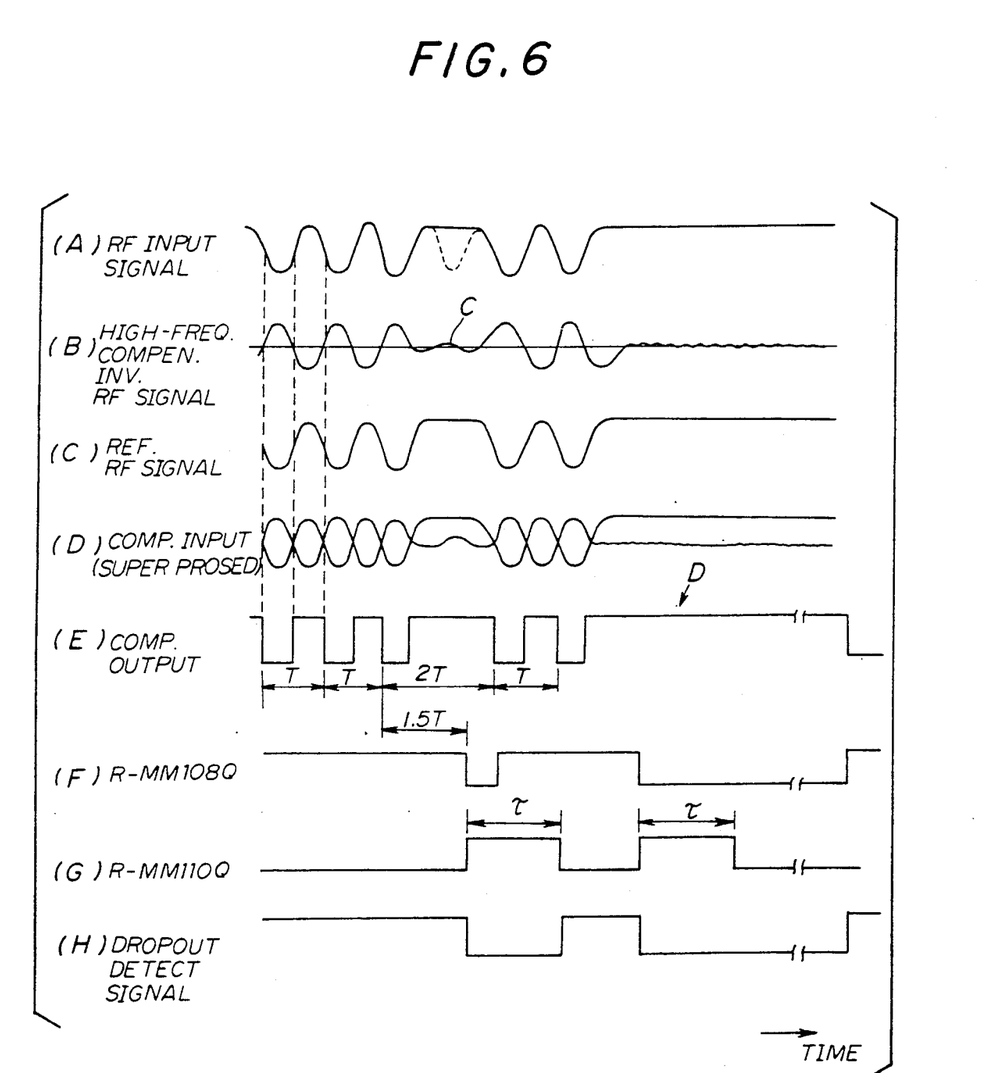

Moreover, should dropout be generated, as shown by the dotted lines for the RF signal in FIG. 6(A), the signals from the high-frequency-range compensation circuit 102 become the status where they are inverted and amplified RF signal as indicated in FIG. 6(B), and the signal from the reference signal generation circuit 104 has an inverted relationship the same as described above and when these two signals are superposed, the status of the superposed signal becomes as indicated in FIG. 6(D). That is, even if a peak C is formed due to the amplification action of the high-frequency-range compensation circuit 102, at a portion where dropout has occurred, the level of the signal will not exceed the signal level from the reference signal generation circuit 104. Because of this, the rectangular pulse from the comparator 106 normally has a cycle T as indicated in FIG. 6(E), and the pulse interval for the portion where the said dropout has generated becomes 2 T. Accordingly, after the re-triggerable mono-stable multivibrator 108 has been triggered and after the time 1.5 T (<2 T) has elapsed, the output Q of re-triggerable mono-stable multivibrator 108 falls. Then the second mono-stable multivibrator 110 is triggered by the signal from the output Q of the re-triggerable mono-stable multivibrator 108 at the fall of the signal and the output Q of the second mono-stable multivibrator 110 becomes the H-level for only the time τ, as indicated in FIG. 6(G). Rectangular pulse from the comparator 106 of the normal cycle T is returned as soon as the pulse interval becomes 2 T as has been described above, because the RF signal returns to normal status as soon as the dropout has been generated (Refer to FIG. 6(A)). Thereby, the re-triggerable mono-stable multivibrator 108 is re-triggered as soon as the output Q falls and the output Q becomes the H-level, and the H-level of the output Q is maintained. As shown in FIG. 6(H), the signal outputs of the re-triggerable mono-stable multivibrator 108 and mono-stable multivibrator 110 cause the output of the NOR circuit 112, namely the dropout detection signal to become L-level when the output Q of the second mono-stable multivibrator 110 becomes H-level (i.e. for time τ). This signal status indicates that dropout has occurred (i.e. dropout has been detected).

Moreover, when dropout of the RF signals continues for a long time, the rectangular pulse output of the comparator 106 holds the H-level such as for the portion D in FIG. 6(E), so that the output Q of the re-triggerable mono-stable multivibrator 108 is fixed at the L-level from a certain point (Refer to FIG. 6(F)). In this case, the dropout detection signal is held at the L-level in the same way for the time that the output Q of the re-triggerable mono-stable multivibrator 108 is held at the L-level for in excess of the above time τ (Refer to FIG. 6(H)).

The dropout detection signal from the dropout detector 100 as described above, is supplied to the switching circuit 40 that was described beforehand. When the dropout detection signal becomes the H-level (normal), this switching circuit 40 maintains the signal path without the one-line delay line 37 and when the dropout detection signal becomes the L-level (dropout occurrence), switches the signal path to the side with the one-line delay line 37. That is, when dropout occurs, the video signal with a dropout portion one line prior and which has been delayed by the 1-line delay line 37, is transferred via the switching circuit 40. Accordingly, the time τ set for the mono-stable multivibrator 110 is determined on the basis of the processing time in order to compensate this dropout video signal by the video signal of the previous line.

In the embodiment described above, the high-frequency-range compensation circuit 102 amplifies the high-frequency component of the RF signal and also inverts the signal at the same time. However, the high-frequency-range compensation circuit 102 need not perform signal inversion as this could alternatively be performed by the reference signal generation circuit 104. In any case, there is an inverse relationship between the signals from the high-frequency-range compensation circuit 102 and the signals from the reference signal generation circuit 104.

The present invention is not limited to the afore mentioned embodiments, and variations and modifications may be made without departing from the scope of the invention.

What is claimed is:

1. A dropout detecting apparatus, comprising:
   information reproducing means for reproducing a high-frequency signal including information stored on an information recording disk;
   high-frequency-range compensating means, coupled to said information reproducing means, for emphasizing a signal component within a high-frequency range of said reproduced high-frequency signal supplied from said information reproducing means;
   reference signal generating means, coupled to said information reproducing means, for deriving a reference signal from said reproduced high-frequency signal supplied from said information reproducing means, said reference signal having an inverse relationship in phase to said reproduced high-frequency signal having the signal component which is emphasized by said high-frequency-range compensating means;
   pulse signal generating means, coupled to said high-frequency-range compensating means and said reference signal generating means, for generating a pulse signal having a waveform corresponding to a variation of the high-frequency signal supplied from said high-frequency-range compensating means with respect to the reference signal supplied from said reference signal generating means; and
   determining means, coupled to said pulse signal generating means, for determining whether said reproduced high-frequency signal includes a dropout on the basis of a change in period of said pulse signal supplied from said pulse signal generating means and for outputting a dropout detection signal based on the determination results.

2. A dropout detecting apparatus as claimed in claim 1, wherein said pulse signal generating means comprises comparing means for comparing the level of said reference signal supplied from said reference signal generating means and the level of said reproduced high-frequency signal supplied from said high-frequency-range compensating means and for generating said pulse signal based on the comparison results.

3. A dropout detecting apparatus as claimed in claim 1, wherein said determining means includes a monostable multivibrator of a re-triggerable type which is triggered by said pulse signal derived from said pulse signal generating means, and said monostable multivibrator has a re-trigger set time which is longer than the period of said pulse signal obtained when said reproduced high-frequency signal has no dropout, and wherein said determining means outputs the dropout detection signal based on an output of said monostable multivibrator.

4. A dropout detecting apparatus as claimed in claim 3 wherein said monostable multivibrator has a re-trigger set time less than twice the period of said pulse signal obtained when said reproduced high-frequency signal has no dropout.

5. A dropout detecting apparatus as claimed in claim 1, wherein said determining means includes:
   a first monostable multivibrator of a re-triggerable type which is triggered by said pulse signal derived from said pulse signal generating means, said first monostable multivibrator having a first re-trigger set time longer than a period of said pulse signal obtained when said reproduced high-frequency signal has no dropout, an output of said first monostable multivibrator changing from a stable state to an unstable state when said first monostable multivibrator is triggered;
   a second monostable multivibrator of a re-triggerable type which is triggered by the output of said first monostable multivibrator so that an output of said second monostable multivibrator is changed from a stable state to an unstable state when the output of said first monostable multivibrator returns to the stable state from the unstable state, said second monostable multivibrator having a second re-trigger set time; and
   gate means, coupled to said first and second monostable means, for generating said dropout detection signal when said first monostable multivibrator is in the stable state or when said second monostable multivibrator is in the unstable state.

6. A dropout detecting apparatus as claimed in claim 1, wherein said information recording disk is an optical disk.

* * * * *